United States Patent [19]

Tomisawa et al.

[11] Patent Number: 5,682,856
[45] Date of Patent: Nov. 4, 1997

[54] APPARATUS FOR CONTROLLING AN INTERNAL COMBUSTION ENGINE AND METHOD THEREOF

[75] Inventors: Naoki Tomisawa; Kenichi Machida, both of Atsugi, Japan

[73] Assignee: Unisia Jecs Corporation, Kanagawa-ken, Japan

[21] Appl. No.: 692,064

[22] Filed: Aug. 7, 1996

[30] Foreign Application Priority Data

Aug. 8, 1995 [JP] Japan .................... 7-202441

[51] Int. Cl.$^6$ .................... F02D 41/14; F02P 5/153
[52] U.S. Cl. .................... 123/425; 123/435
[58] Field of Search .................... 123/425, 435; 364/431.08

[56] References Cited

U.S. PATENT DOCUMENTS

| | | | |
|---|---|---|---|
| 4,621,603 | 11/1986 | Matekunas | 123/425 |
| 4,928,653 | 5/1990 | Ohkubo et al. | 123/435 |
| 4,971,009 | 11/1990 | Washino et al. | 123/435 |
| 5,353,764 | 10/1994 | Tomisawa | 123/435 |
| 5,421,305 | 6/1995 | Tomisawa | 123/435 |
| 5,499,607 | 3/1996 | Tomisawa | 123/435 |
| 5,592,919 | 1/1997 | Morikawa | 123/435 |

FOREIGN PATENT DOCUMENTS 63-17432  2/1988  Japan .

*Primary Examiner*—Willis R. Wolfe
*Attorney, Agent, or Firm*—Lowe, Price, LeBlanc & Becker

[57] ABSTRACT

A rate of change in the combustion pressure in each of the cylinders is calculated based upon a result detected by a combustion pressure sensor provided for each of the cylinders. The air-to-fuel ratio is increased and/or the ignition timing is retarded for each of the cylinders so that a rate of change in the combustion pressure approaches a value corresponding to the combustion stability limit in each of the cylinders.

10 Claims, 4 Drawing Sheets

# APPARATUS FOR CONTROLLING AN INTERNAL COMBUSTION ENGINE AND METHOD THEREOF

BACKGROUND OF THE INVENTION

1. Field of the Invention

The present invention relates to an apparatus for controlling an internal combustion engine and to a method thereof. More specifically, the invention relates to technology for increasing an air-to-fuel ratio of a combustion mixture gas to a combustion stability limit and for retarding an ignition timing to a combustion stability limit.

2. Related Art of the Invention

Attempts have heretofore been made to increase an air-to-fuel ratio of a combustion mixture gas within a range in which a change in engine output does not exceed a tolerance limit and to retard an ignition timing, thereby controlling the air-to-fuel ratio and the ignition timing to near the a combustion stability limit.

Concretely speaking, a combustion pressure is detected in each cylinder using a combustion pressure sensor provided for each cylinder, and a rate of change in the combustion pressure in each combustion according to the order of ignition, i.e., a rate of change in the combustion pressure among the cylinders, is calculated based upon the combustion pressure detected in each cylinder, so that the air-to-fuel ratio is increased and the ignition timing is retarded within a range in which the rate of change does not exceed a predetermined value which corresponds to the combustion stability limit.

Here, if the combustion pressure sensors provided for the respective cylinders produce varying output values, then, the detected combustion pressure value varies among the cylinders despite the practical combustion pressures are close to each other among the cylinders and stable combustion is taking place in each of the cylinders. A deviation in the detected combustion pressure value in the cylinders is often erroneously detected as a change in output, and the operation for increasing the air-to-fuel ratio and the operation for retarding the ignition timing are often halted before the combustion limit is reached.

In the case of a sensor which uses a ring-like piezoelectric element as a washer of an ignition plug and detects the combustion pressure as a relative pressure to a load for fastening the ignition plug, variations in the fastening load turns into a large variation in the output characteristics among the sensors, making it difficult to control the air-to-fuel ratio or the ignition timing up to the combustion stability limit.

SUMMARY OF THE INVENTION

The present invention was accomplished in view of the above-mentioned problems, and its object is to provide a control apparatus capable of so controlling an air-to-fuel ratio and an ignition timing as to accomplish a combustion stability limit even when combustion pressure sensors provided for respective cylinders have variations in their output characteristics, and a method thereof.

In an apparatus and method of controlling an internal combustion engine for accomplishing the above-mentioned object according to the present invention, a rate of change in the combustion pressure is calculated for each cylinder based upon the combustion pressure in each cylinder detected by a combustion pressure sensor provided for each cylinder of the engine, and fuel injection amounts from fuel injection valves provided for the respective cylinders are individually corrected so that the rate of change in combustion pressure in each cylinder approaches a value corresponding to a combustion stability limit.

That is, whether the combustion stability limit is reached or not is not judged based upon variations in combustion pressure in the cylinders but, instead, a change in combustion pressure is found for each of the cylinders, to carry out the injection amount control, i.e., the air-to-fuel ratio control for each of the cylinders.

According to the apparatus and method of controlling an internal combustion engine of the present invention, furthermore, a rate of change in the combustion pressure is calculated for each cylinder based upon the combustion pressure in each cylinder detected by the combustion pressure sensor provided for each cylinder of an engine, and ignition timings for ignition plugs provided for the respective cylinders are individually corrected so that a rate of change in the combustion pressure in each cylinder approaches a value corresponding to the combustion stability limit.

That is, whether the combustion stability limit is reached or not is not judged based upon variations in combustion pressure in the cylinders but, instead, a change in the combustion pressure is found for each of the cylinders, to carry out the separate ignition timing control for each of the cylinders.

Here, the combustion pressure sensor may be a washer type sensor fitted as a washer to the ignition plug of each cylinder.

In the case of the above-mentioned washer type sensors, the sensor output values may vary to a large extent among the cylinders due to variations in load for fastening the ignition plugs. According to the apparatus and method of the present invention, however, a rate of change in the combustion pressure is detected for each of the cylinders instead of detecting a change in combustion pressure among the cylinders. Therefore, variations in the absolute value of the sensor output does not affect the detection of a rate of change, so that a change in the output of the engine is prevented from erroneously being detected due to variations in the sensor outputs among the cylinders.

It is further preferable that the combustion pressure in each of the cylinders detected by the combustion pressure sensor is integrated over a predetermined integration section, and a rate of change in the integrated value in each of the cylinders is calculated as a rate of change in combustion pressure in each of the cylinders.

The rate of change in the combustion pressure can further be calculated based upon a combustion pressure at a predetermined crank angle position. By integrating the detected value of the combustion pressure as described above, however, it is allowed to suppress the effect of noise and to maintain high precision in calculating the rate of change.

It is further preferable that the above-mentioned predetermined integration section is a range of crank angle range of from the compression TDC to ATDC 100° of each cylinder.

That is, with the integration section being limited to a practical cobustion section, it is allowed to detect a change in combustion pressure due to variations in combustion to a high sensitivity.

Other objects and aspects of the present invention will become obvious from the following description of an embodiment in conjunction with the accompanying drawings.

PREFERRED EMBODIMENT

Figure 1:
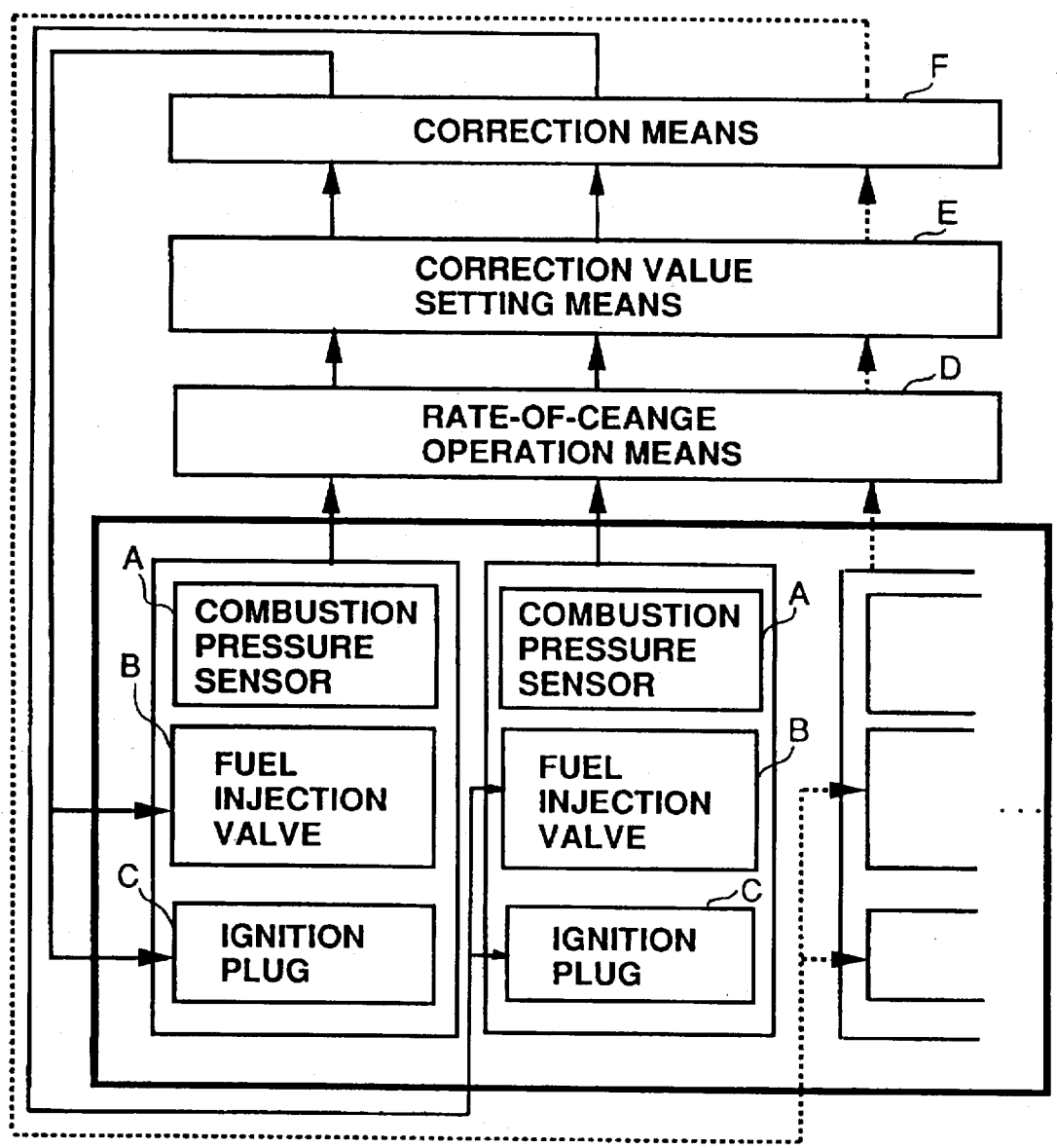
FIG. 1 is a block diagram illustrating the basic construction of a control apparatus according to the present invention.

FIG. 1 is a block diagram illustrating the basic construction of an apparatus for controlling an internal combustion engine according to the present invention.

In FIG. 1, each cylinder is provided with a combustion pressure sensor A, a fuel injection valve B and an ignition plug C. An output from the combustion pressure sensor A provided in each cylinder is sent to a rate-of-change operation means D where a rate of change in the combustion pressure in each of the cylinders is operated.

The rate of change in each of the cylinders operated by the rate-of-change operation means D is output to a correction value setting means E which sets a correction value for correcting an injection amount by the fuel injection valve for each of the cylinders and/or sets a correction value for correcting an ignition timing for the ignition plug, so that a rate of change in combustion pressure in each of the cylinders approaches a value that corresponds to a combustion stability limit.

The correction value set by the correction value setting means E for each of the cylinders is output to a correction means F which, then, corrects the injection amount and/or the ignition timing for each of the cylinders.

The control apparatus and the control method having the above-mentioned basic construction will now be described by way of an embodiment with reference to the drawings.

Figure 2:
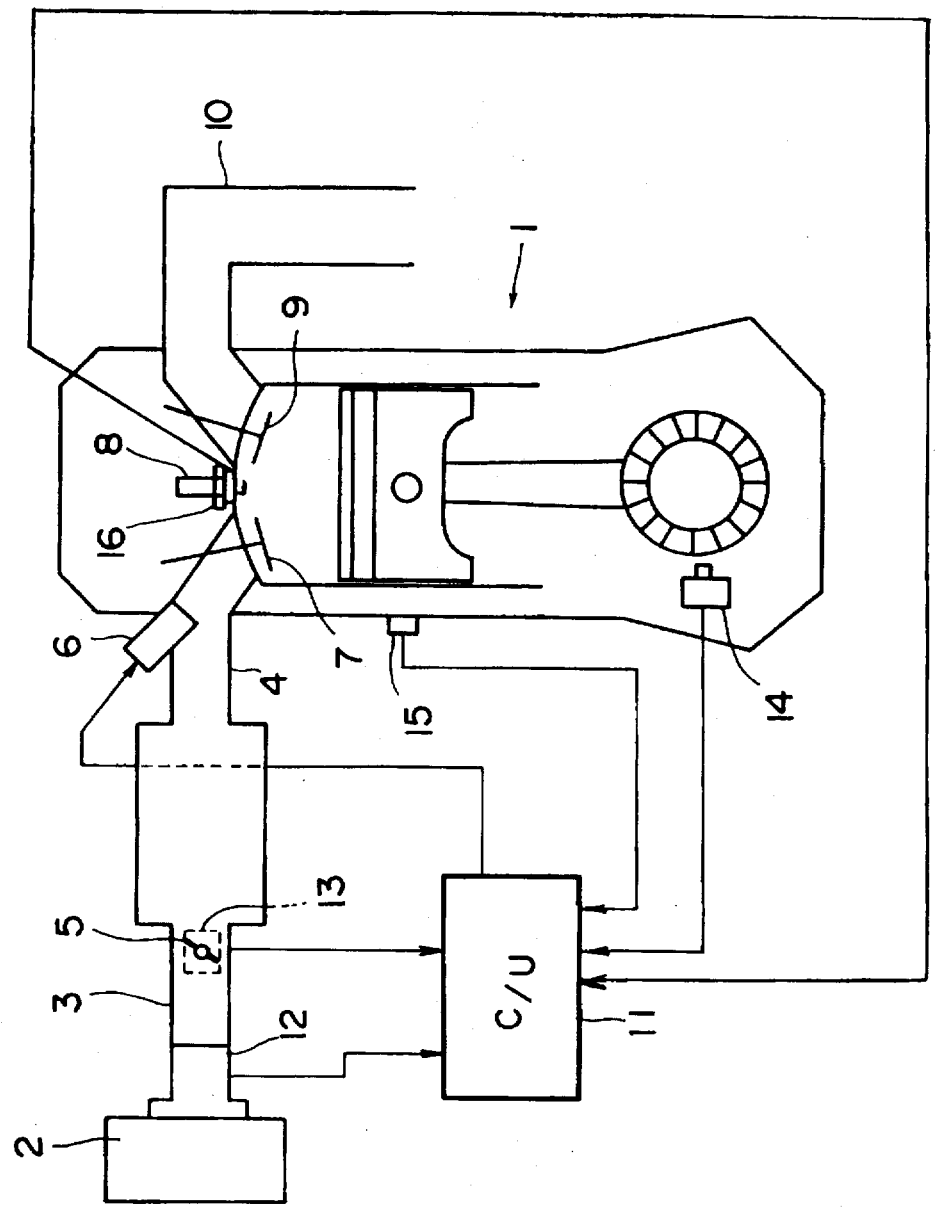
FIG. 2 is a diagram illustrating a system constitution of an engine according to an embodiment.

Referring to FIG. 2 illustrating a system constitution according to an embodiment, an internal combustion engine 1 intakes air through an air cleaner 2, an intake duct 3 and an intake manifold 4.

In the intake duct 3 is disposed a butterfly-type throttle valve 5 interlocked to an accelerator pedal that is not shown, and an intake air amount of the engine is adjusted by the throttle valve 5.

In the branch portions of the intake manifold 4 is provided an electromagnetic fuel injection valve 6 for each cylinder. A mixture gas of a predetermined air-to-fuel ratio is formed by electronically controlling a fuel amount injected from the fuel injection valve 6. By separately controlling the fuel injection valve 6 provided for each of the cylinders, it is allowed to inject the fuel in an amount which differs depending upon the cylinders.

The mixture gas intaken into the cylinder through an intake valve 7 is ignited by a spark produced by an ignition plug 8 provided for each of the cylinders, and an exhaust gas is exhausted via an exhaust valve 9 and is guided to a catalystic converter and to a muffler that are not shown through an exhaust manifold 10.

A control unit 11 which controls the fuel injection amount through the fuel injection valve 6 and the ignition timing for the ignition plug 8, includes a microcomputer and receives an intake air amount signal Q from a hot-wire air-flow meter, a throttle valve opening-degree signal TVO from a throttle sensor 13, a crank-angle signal from a crank angle sensor 14, a cooling water temperature signal Tw from a water temperature sensor 15, and a cylinder pressure signal P from a cylinder pressure sensor 16 (combustion pressure sensor) and the like.

The hot-wire air-flow meter 12 detects the intake air amount of the engine 1 as a mass flow rate based upon a change in resistance of a temperature sensing resistor due to the intake air amount.

The throttle sensor 13 detects the opening degree TVO of the throttle valve 5 by using a potentiometer.

The crank angle sensor 14 outputs a unit angle signal for every unit crank angle and a reference angle signal for every predetermined piston position. The rotational speed Ne of the engine is calculated by measuring the number of the unit angle signals generated within a predetermined period of time or by measuring the period of generation of the reference angle signal.

The water temperature sensor 15 detects the cooling water temperature Tw in the water jacket of the engine 1 as a temperature that represents the engine temperature.

The cylinder pressure sensor 16 (combustion pressure sensor) is a ring-like piezo-electric element (washer pressure sensor) fitted as a washer to the ignition plug 8 as disclosed in Japanese Unexamined Utility Model Publication (Kokai) No. 63-17432, and detects the combustion pressure as a relative pressure to the load for fastening the ignition plug. The cylinder pressure sensor 16 is fitted to every ignition plug 8 attached to each of the cylinders in order to detect the cylinder pressure P (combustion pressure) in each of the cylinders. The cylinder pressure sensor 16 may be the type in which the sensor unit faces directly inside the combustion chamber to detect the cylinder pressure as an absolute pressure instead of the type fitted as a washer to the ignitinon plug 8 as described above.

The control unit 11 determines a basic ignition timing (basic ignition advance value) based upon the engine operation conditions such as the engine load and the rotational speed of the engine, and controls the ignition timings for the ignition plugs 8.

The control unit 11 further controls the fuel injection amount by the fuel injection valve 6 in a manner as described below.

A basic fuel injection amount Tp (=K×Q/Ne: K is a constant) corresponding to the target air-to-fuel ratio is calculated based upon the intake air amount Q detected by the hot-wire air-flow meter 12, the rotational running speed Ne of the engine calculated from the signals detected by the crank angle sensor 14, and is corrected depending upon the operation conditions such as the cooling water temperature Tw and the like, in order to obtain a final fuel injection amount Ti. A drive pulse signal of a pulse width corresponding to the fuel injection amount Ti is output at a predetermined timing to the fuel injection valve 6. The fuel which is adjusted to a predetermined pressure by a pressure regulator that is not shown, is fed to the fuel injection valve 6, and the fuel of an amount proportional to the pulse width of the drive pulse signal is injected to form a mixture gas of a predetermined air-to-fuel ratio.

In addition to basically controlling the ignition timing and air-to-fuel ratio (fuel injection amount), the control unit 11 calculates a change in combustion pressure for each of the cylinders based upon the pressure in each cylinder detected by the cylinder pressure sensor 16 (rate-of-change operation means), and executes based upon the calculated result the feedback control to retard the ignition timing and to increase the air-to-fuel ratio within a range in which a change in the combustion pressure does not exceed a tolerance limit (correction value setting means, correction means). The manner of such a control operation will now be described in detail with reference to a flow chart of FIG. 3.

Figure 3:
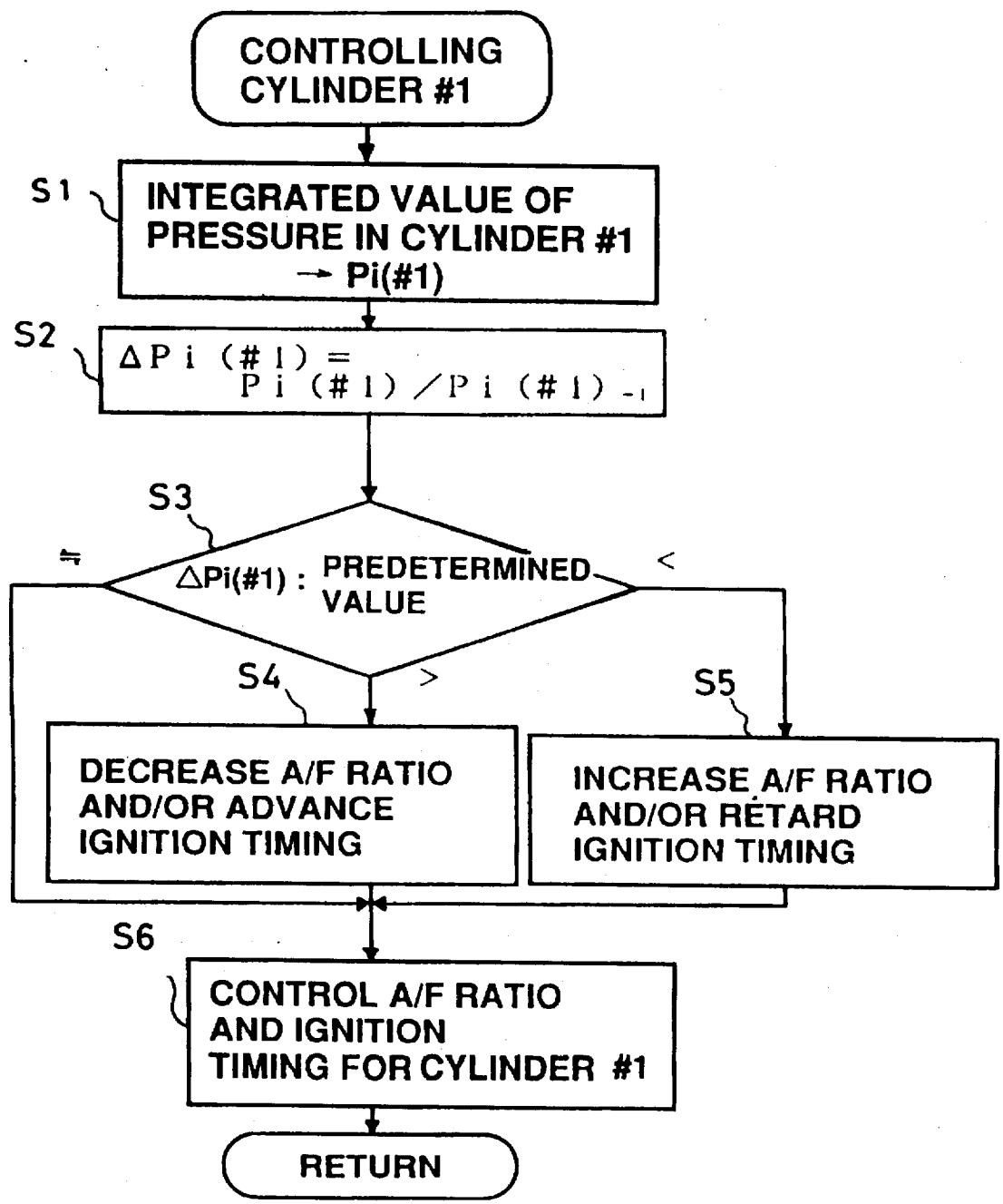
FIG. 3 is a flow chart illustrating the manner of feedback control of the air-to-fuel ratio and the ignition timing according to the embodiment.

The flow chart of FIG. 3 illustrates a program for controlling the ignition timing and the air-to-fuel ratio for a cylinder #1. The control operation quite the same as that of the flow chart of FIG. 3 is independently executed even for other cylinders to separately control the ignition timing and the air-to-fuel ratio for each of the cylinders.

First, at step 1 in the flow chart of FIG. 3 (denoted as S1, the same holds hereinafter), a detection signal from the cylinder pressure sensor 16 provided in the cylinder #1 is subjected to the A/D conversion and is read, and the cylinder pressure thus read is integrated over a predetermined integration section (e.g., from the compression TDC to ATDC 100°) to obtain an integrated value P i(#1).

At step 2, a ratio $\Delta Pi$ (#1) of the latest value to the previous value of the integrated value Pi (#1) is calculated as a rate of change in the combustion pressure in the cylinder #1 (rate-of-change operation means).

At step 3, the rate of change in the combustion pressure $\Delta Pi$ (#1) in the cylinder #1 is compared with a predetermined value that has been set in advance as a value corresponding to a combustion stability limit.

When the rate of change in the combustion pressure $\Delta Pi$ (#1) is greater than the predetermined value, the program proceeds to step 4 where the air-to-fuel ratio is decreased and/or the ignition timing is advanced in order to recover stable combustion.

The air-to-fuel ratio is decreased by, for example, increasing a multiplication correction term in the basic fuel injection amount Tp by a predetermined value (correction value setting means) in order to increase the fuel injection amount Ti (correction means).

The ignition timing is advanced by, for example, increasing an addition correction term in the basic ignition timing by a predetermined value (correction value setting means) in order to increase the ignition advance value (correction means).

When the rate of change in the combustion pressure $\Delta Pi$ (#1) is smaller than the above-mentioned predetermined value, the air-to-fuel ratio can be increased or the ignition timing can be retarded without exceeding the combustion stability limit. The program therefore proceeds to step 5 where the air-to-fuel ratio is increased and/or the ignition timing is retarded.

The air-to-fuel ratio is increased by, for example, decreasing the multiplication correction term in the basic fuel injection amount Tp by a predetermined value (correction value setting means) to decrease the fuel injection amount Ti (correction means).

The ignition timing is retarded by, for example, decreasing the addition correction term for the basic ignition timing by a predetermined value (correction value setting means) to decrease the ignition advancing value (correction means).

When the rate of change in the combustion pressure $\Delta Pi$ (#1) is nearly in agreement with the predetermined value and it is regarded that the ignition timing or the air-to-fuel ratio has been controlled to be near the combustion stability limit, the program proceeds to step 6 without correcting the air-to-fuel ratio or the ignition timing.

In step 6, the correction term in the air-to-fuel ratio (fuel injection amount) and/or in the ignition timing controlled based on the comparison of the rate of change in the combustion pressure $\Delta Pi$ (#1) with the predetermined value, is stored as data corresponding to the cylinder #1 depending upon the operation conditions, and the injection amount and the ignition timing are practically corrected based on the thus stored data.

Owing to the above-mentioned control operation, the ignition timing and/or the air-to-fuel ratio for the cylinder #1 are precisely controlled to be near the combustion stability limit.

Figure 4:
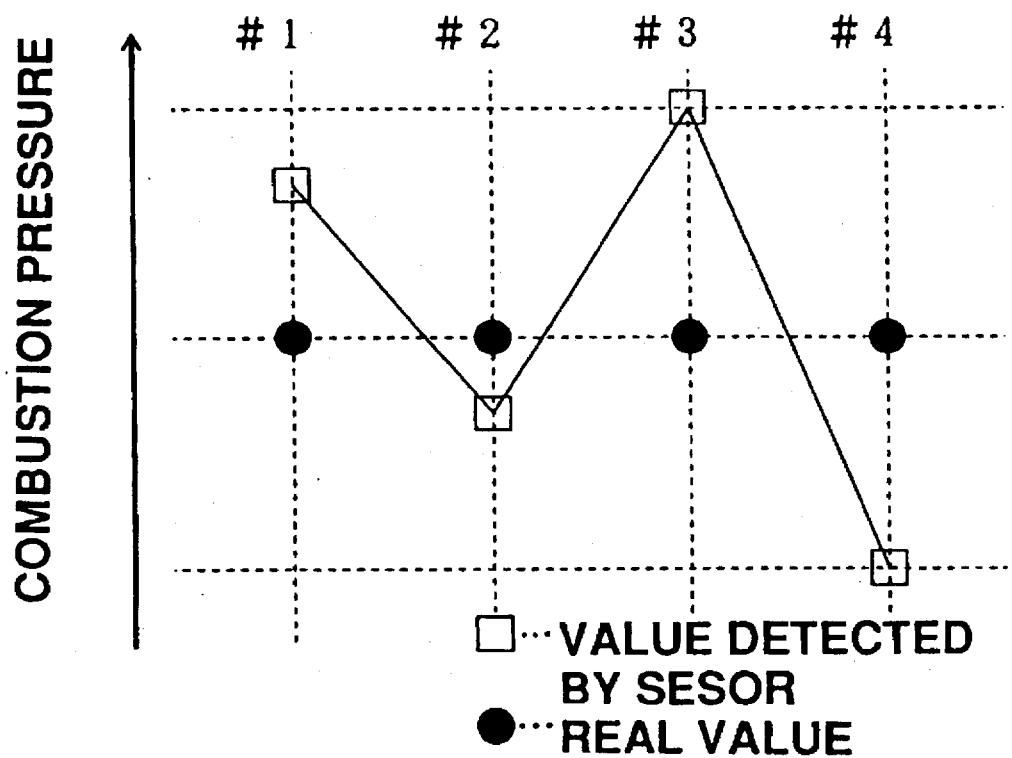
FIG. 4 is a graph illustrating variations in detection of the combustion pressure.

The cylinder pressure sensor 16 is a washer sensor that is fastened together with the ignition plug 8, and variations in the torque for fastening the ignition plugs affects the sensor output (see FIG. 4). With the rate of change in the integrated value Pi being calculated for each of the cylinders as described above, however, a shift in the absolute value of the sensor output does not affect the calculation of the rate of change. Therefore, a change in the combustion pressure in the cylinder #1 is precisely detected, the air-to-fuel ratio can be increased to a maximum degree, and the ignition timing can be retarded to a maximum degree.

The same control operation is executed even for other cylinders. Therefore, the air-to-fuel ratio and the ignition timing are precisely controlled to be near the combustion stability limit for each of the cylinders.

It is also allowable to detect the cylinder pressure (combustion pressure) at a predetermined crank angular position instead of using the integrated value Pi. Use of the integrated value Pi, however, makes it possible to detect the combustion pressure being little affected by noise.

We claim:

1. An apparatus for controlling an internal combustion engine comprising:

an ignition plug provided for each cylinder of the engine;
   a combustion pressure sensor provided for each of the cylinders of the engine;
   a rate-of-change operation means for operating a rate of change in the combustion pressure in each of the cylinders based on the combustion pressure in each of the cylinders detected by said combustion pressure sensor;
   a correction value setting means for setting a correction value for correcting an ignition timing for said ignition plug for each of the cylinders so that the rate of change in the combustion pressure in each of the cylinders calculated by said rate-of-change operation means approaches a value corresponding to a combustion stability limit; and
   a correction means for separately correcting the ignition timings for said ignition plugs based upon the correction values for the cylinders set by said correction value setting means.

2. A method of controlling an internal combustion engine wherein a rate of change in the combustion pressure in each of the cylinders is calculated based upon the combustion pressure in each cylinder detected by a combustion pressure sensor provided for each of the cylinders of the engine, and ignition timings for the ignition plugs provided for each of the cylinders are separately corrected so that the rate of change in the combustion pressure in each of the cylinders approaches a value corresponding to a combustion stability limit.

3. An apparatus for controlling an internal combustion engine comprising:

a fuel injection valve provided for each cylinder of the engine;

a combustion pressure sensor provided for each of the cylinders of the engine;

a rate-of-change operation means for operating a rate of change in the combustion pressure in each of the cylinders based on the combustion pressure in each of the cylinders detected by said combustion pressure sensor;

a correction value setting means for setting a correction value for correcting a fuel injection amount through said fuel injection valve for each of the cylinders so that the rate of change in the combustion pressure in each of the cylinders calculated by said rate-of-change operation means approaches a value corresponding to a combustion stability limit; and a correction means for separately correcting the fuel injection amounts through said fuel injection valves based upon the correction values for the cylinders set by said correction value setting means.

4. An apparatus for controlling an internal combustion engine according to claim 3, wherein said combustion pressure sensor is a washer sensor fitted as a washer to the ignition plug for each of the cylinders.

5. An apparatus for controlling an internal combustion engine according to claim 3, wherein said rate-of-change operation means integrates the combustion pressure in each of the cylinders detected by said combustion pressure sensor over a predetermined integration section, and calculates the rate of change in said integrated value of each of the cylinders as a rate of change in the combustion pressure in each of the cylinders.

6. An apparatus for controlling an internal combustion engine according to claim 5, wherein said predetermined integration section is a crank angle range of from the compression TDC to ATDC 100° for each of the cylinders.

7. A method of controlling an internal combustion engine wherein a rate of change in the combustion pressure in each cylinder is calculated based upon the combustion pressure in each of the cylinders detected by a combustion pressure sensor provided for each of the cylinders of the engine, and fuel injection amounts through fuel injection valve provided for the cylinders are separately corrected so that the rate of change in the combustion pressure in each of the cylinders approaches a value corresponding to a combustion stability limit.

8. A method of controlling an internal combustion engine according to claim 7, wherein said combustion pressure sensor is a washer sensor fitted as a washer to the ignition plug of each of the cylinders.

9. A method of controlling an internal combustion engine according to claim 7, wherein the combustion pressure in each of the cylinders detected by said combustion pressure sensor is integrated over a predetermined integration section, and a rate of change in the integrated value for each of the cylinders is calculated as a rate of change in the combustion pressure in each of the cylinders.

10. A method of controlling an internal combustion engine according to claim 9, wherein said predetermined integration section is a crank angle range of from the compression TDC to ATDC 100° of each of the cylinders.

* * * * *